United States Patent [19]

Germanaud et al.

[11] Patent Number: 4,986,924

[45] Date of Patent: Jan. 22, 1991

[54] POLYMERIC COMPOUNDS ESPECIALLY USEFUL AS ADDITIVES TO LUBRICANTS AND COMPOSITIONS CONTAINING SAID COMPOUNDS

[75] Inventors: Laurent Germanaud, Irigny; Nguyen Truong Dinh; Gilbert Marie, both of Pau; Patrick Turello, Francheville, all of France

[73] Assignee: Societe Nationale Elf Aquitaine, Paris, France

[21] Appl. No.: 266,946

[22] Filed: Nov. 3, 1988

[30] Foreign Application Priority Data

Nov. 5, 1987 [FR] France ................... 87 15347

[51] Int. Cl.$^5$ ............................................ C10M 133/56
[52] U.S. Cl. ............................ 252/51.5 A; 252/51.5 R; 525/132; 525/301; 525/380
[58] Field of Search ................ 252/50, 51, 51.5 A, 252/51.5 R, 52 R, 56 R; 525/132, 301, 380

[56] References Cited

U.S. PATENT DOCUMENTS

| | | | |
|---|---|---|---|
| 3,493,520 | 2/1970 | Verdol | 252/51.5 A |
| 3,563,960 | 2/1971 | Verdol | 525/132 |
| 3,951,831 | 4/1976 | Willette | 252/47.5 |
| 4,098,709 | 7/1978 | Hanauer | 252/51.5 A |
| 4,170,562 | 10/1979 | West | 252/51.5 A |
| 4,500,440 | 2/1985 | Kaufman | 252/51.5 A |

*Primary Examiner*—Olik Chaudhuri
*Assistant Examiner*—Ellen McAvoy
*Attorney, Agent, or Firm*—Burgess, Ryan & Wayne

[57] ABSTRACT

The invention provides polymeric compounds resulting from the condensation of a primary amine having one phenolic group in its molecule with a copolymer of carboxylic acid functions.

The copolymer is formed by copolymerization of an unsaturated monocarboxylic acid with at least one derivative of such a acid or by grafting of an unsaturated acid on a hydrocarbon polymer. These compounds can be especially used as multifunctional additives to lubricants.

21 Claims, No Drawings

POLYMERIC COMPOUNDS ESPECIALLY USEFUL AS ADDITIVES TO LUBRICANTS AND COMPOSITIONS CONTAINING SAID COMPOUNDS

FIELD OF THE INVENTION

The invention relates, in general, to polymeric compounds resulting from the condensation of a primary amine having one phenolic group in its molecule with a copolmer with carboxylic acid functions. In one aspect, this invention relates to the formation of copolymers by copolymerization of an unsaturated monocarboxylic acid with at least one derivative of such an acid or by grafting of an unsaturated acid on a hydrocarbon polymer. These compounds can be especially used as multifunctional additives to lubricants.

BACKGROUND OF THE INVENTION

It is known that lubricating oils and in particular, the oils for gear case designed for internal combustion engines contain various additives that serve to improve the performances of the oils while they are being used. Certain additives are used for increasing the viscosity index of the oil while others ensure, for example, keeping the gear case clean by suspending the insoluble deposits, also called slime, that form in the oil.

The additives intended to improve the viscosity index of the oil must have, on one hand, a sufficient thickening effect on a light lubricating oil in order that at elevated temperatures, the lubricating properties of this oil correspond to those of a heavier lubricating oil and, on the other hand, a limited thickening effect on a light lubricating oil in order that at lower temperatures, the characteristics of the oil not be disturbed at those low temperatures. Those are generally polymeric compounds with long chains such as, for example, polyisobutenes, polymethacrylates, polyalkylstyrenes, partially hydrogenated copolymers of butadiene and of styrene and amorphous copolymers of ethylene and of propene. The additives that ensure the maintenance of the cleanliness of the gear case are, on the one hand, detergents such as, for example, sulfonates, phenates or organic phosphates of polyvalent metals which are particularly effective when the engine is hot and, on the other hand, dispersants such as, for example, succinimides or succinic esters alkylated by a polymer of isobutene or of propene on the carbon atom in alpha of the carbonyl of the succinimide, these additives working more particularly during travel when the engine is cold, such as those automobiles that make frequent stops.

There has also been proposed additives for lubricating oils intended to ensure simultaneously the improvement of the viscosity index of the oils and the dispersion of the slime they may contain. Those compounds are obtained, for example, by introducing monomers that have been nitrogenized, either by copolymerization or by grafting, on a thickening polymer. The nitrogenized dispersing monomers are preferably selected among the maleimides, vinyl imidazolines, vinyl pyrrolidines, vinyl pyridines or N,N-dialkylaminoethyl methacrylates. The following patents claim the use of such compounds:

EP Nos. 171,167; 167,195; 164,807; 145,369; U.S. Pat. Nos. 4,606,834; 3,732,334; and DE No. 874,068.

However, multifunctional additives for lubricants having other properties than improvers of viscosity and dispersants have been sought. The formulators are increasingly seeking additives having a great thermal stability and a resistance to oxidation which are important because of the increasing severity of the functioning conditions of engines. Thus, there is observed an increase of the working temperature of the lubricant, particularly in diesel engines subjected to strong charges where the temperature at the top of the piston, in the vicinity of the first recess, can reach and actually exceed 350° C. Lubricants have a tendency to oxidize when they are subjected to elevated temperatures. This decomposition is proportional to the thermal stability and to the resistance to oxidation of the oil and the additives. It causes the formation and deposit of resinous compounds and carbonaceous substances on the walls of the piston. If these deposits become too large, they can start a gumming or abrasion of the piston and increase the wear of the metal parts in motion. Therefore, it is important to control and limit such deposits by using additives that are effective and stable at elevated temperatures.

In the prior art, the protection of the lubricating oils by antioxidizing organic molecules has been extensively described. These compounds are, in general, distinguished by the manner in which they act; on one hand, the inhibitors of the free radicals (phenols, aromatic amines, phenothiazines and the like) and, on the other hand, the products that destroy the peroxides (metal dithiophosphates or dithiocarbamates).

Likewise, known are the metal deactivators (benzothiazoles, tetrazole and the like), which protect the metals against the action of the oxygenated compounds formed during the degradation of the lubricants. These compounds are not antioxidants in the classic sense of the word, but metal anticorrosives or passivators which bring a supplementary protection in respect to the corrosive products formed by oxidation of the oil.

The use of antioxidizing molecules of low molecular weight can involve several inconveniences; in particular, these products have a limited solubility in oil and are, at times, volatile and subliminal when the engine works at a rate close to its maximum rate.

These inconveniences can be eliminated by using polymers that improve the viscosity and provide antioxidizing functions. Another advantage of these multifunctional polymers is to concentrate the antioxidizing structures carried by the polymer in the upper parts of the engine during the "flash" evaporations of the oil when the protection against oxidation is most necessary.

The polymers that improve the viscosity and are antioxidizing were known in the prior art.

U.S. Pat. No. 4,500,440 claims an ethylene-propylene copolymer carrier of epoxide functions obtained by grafting glycidyl methacrylate and treated by amino-5-tetrazole.

U.S. Pat. Nos. 4,339,561 and 4,281,192 and DE No. 2,943,166 describe copolymers of alkyl (meth)acrylates and of hydroxy-2,5-trimethyl-3,4,6 benzyl (meth)acrylamide and eventually of a dispersant monomer such as N,N, dimethyl aminoethyl (meth)acrylate.

U.S. Pat. No. 4,170,562 concerns the reaction of olefinic polymers oxidized with a base of Mannich starting from a polyamine, an aldehyde and a phenol. This reaction gives an ill-defined mixture of several products.

U.S. Pat. No. 4,668,412 concerns the reaction of maleic anhydride copolymers and methacrylic esters with Mannich bases; but, it is known that the copolymerization of maleic anhydride is very incomplete and the copolymer formed is accompanied by a monomer hard to separate. The formation of a Mannich base without the addition of a supplementary amine furnishes a crosslinked product that cannot be used.

U.S. Pat. Nos. 4,205,151 and 4,078,091 describe homopolymers of a maleimide prepared by reaction of a disubstituted paraaminophenol with maleic anhydride.

U.S. Pat. No. 4,098,709 mentions the preparation and use of antioxidizing polymers by reaction of a phenolic derivative on a polymer carrier of free carboxylic acid functions. The product having an ester-amide structure is sensitive to hydrolysis. The synthesis of the phenolic pattern is long and costly. It passes through four stages and numerous purifications.

U.S. Pat. Nos. 4,096,139 and 3,951,831 concern polymers prepared by postesterification of a polymer carrier of free carboxylic acid functions by a beta hydroxy amide replaced by a derivative of the benzothiazole.

SUMMARY OF THE INVENTION

It has also been found that a family of polymeric compounds can be used as multifunctional additives to lubricants. These compounds improve the viscosity of the lubricants while playing the part of dispersant and antioxidant.

The polymeric compounds according to the invention that can be especially used as multifunctional additives to lubricants result from the condensation of a primary amine having a phenolic group in its molecule with a copolymer with carboxylic acid functions formed by copolymerization of an unsaturated monocarboxylic acid with at least one derivative of such an acid or by grafting of an unsaturated acid on a hydrocarbon polymer.

DETAILED DESCRIPTION OF THE INVENTION

The unsaturated monocarboxylic acid is generally copolymerized with at least one ester of said acid. The presence of a nitrogenized monomer can be advantageous.

The unsaturated monocarboxylic acid is generally selected among the acrylic and methacrylic acids. The corresponding esters are formed with alcohols containing preferably between 1 and 22 carbon atoms. As examples can be cited, the (meth)acrylates of methyl, ethyl, n-butyl, ethyl-2-hexyl, octyl, decyl, dodecyl, n-tetradecyl, n-hexadecyl, n-octadecyl and the like.

There will be advantageously used an industrial mixture of several alkyl (meth)acrylates having variable chain lengths. If the medium number of carbon atoms of the alkyl chains is comprised of between 6 and 15, preferably between 8 and 13, the copolymer has a good thickening power and imparts to the oil good properties at low temperature.

The nitrogenized monomer that can form part of the composition of the copolymer preferably corresponds to the general formula:

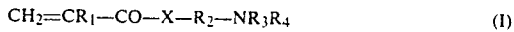

$$CH_2=CR_1-CO-X-R_2-NR_3R_4 \quad (I)$$

wherein $R_1$ is the hydrogen atom or the methyl radical;

X represents an oxygen or sulfur atom or the —NH— group;

$R_2$ is an alkylene group containing from 2 to 6 carbon atoms; and $R_3$ and $R_4$, identical or different, are alkyl, cycloalkyl, alkylaryl or aryl radicals. The radicals are preferably methyl and ethyl.

As examples of nitrogenized monomers, there can be cited N,N-dimethyl amino propyl methacrylamide, N,N-diethyl amino propyl methacrylamide, N,N-diemethyl amino ethyl methacrylamide, N,N-diethyl amino ethyl methacrylamide, N,N-diemethyl amino ethyl methacrylate or the N,N-diethyl amino ethyl methacrylate.

The copolymer, likewise, can be prepared by grafting an unsaturated acid on a hydrocarbon polymer.

The hydrocarbon polymer can be selected among the ethylene copolymers, dienic polymers and alpha-olefin homopolymers.

The preferred hydrocarbon polymers are ethylene copolymers. They generally contain from 15 to 90%, preferably from 25 to 80%, by weight of ethylene and from 0 to 20% by weight of a non-conjugated diene, the compliment coming from at least one alpha-olefin with from $C_3$ to $C_{24}$.

Among the alpha-olefins, there can be cited propylene, butene, pentene, heptene, octene, nonene, decene, methyl-4-pentene and methyl-5-pentene. The ethylene copolymers generally contain from 1 to 3 of said alpha-olefins.

The linear or cyclic non-conjugated dienes are generally selected among hexadiene-1,4, methyl-2-pentadiene-1,4, cyclopentadiene-1,4, cyclooctadiene-1,5 and the derivatives of the norbornene such as methylene-5-norbornene-2.

The ethylene-propylene copolymers are preferably used among the ethylene copolymers.

These copolymers are substantially amorphous and have a medium molecular weight comprised of between 5,000 and 500,000, preferably between 20,000 and 100,000 and a polydispersity below 10, preferably below 4.

The dienic copolymers are prepared by copolymerization of two diolefins such as butadiene, isoprene dimethyl-2,2-butadiene or the copolymerization of one diolefin with styrene. As examples of dienic copolymers there can be cited the butadiene-styrene or butadiene-isoprene copolymers. These copolymers are preferably used in the hydrogenated form for reducing the olefinic unsaturations and consequently their susceptibility to oxidation.

Among the dienic homopolymers there can be mentioned the butadiene, isoprene or dimethyl-2,3-butadiene polymers.

The alpha-olefin homopolymers originate from alpha-olefins containing at least four carbon atoms. Among said homopolymers the most important is polyisobutylene.

The unsaturated acid that will be grafted on the hydrocarbonated polymer includes a polymerizable double bond and at least one acid function or a precursor of acid function capable of transforming into acid function by hydrolysis or oxidation after grafting or one anhydride function.

Within the scope of the invention, the (meth)acrylic acids, the alkyl (meth)acrylates, the maleic anhydride, the chloromaleic anhydride or the itaconic anhydride can be used.

Maleic anhydride can be advantageously used, since the grafting is effected under mild conditions and the anhydride has no tendency to form homopolymers as by-products.

The primary amines having a phenolic group in their molecule are obtained by reaction of a phenol, a (hydroxyphenyl)alkyl aldehyde or a (hydroxyphenyl)alkyl acid with a polyamine.

When using a phenol, the introduction of the amine function takes place in the presence of an aldehyde by the so-called Mannich reaction. The phenol used must have at least one active hydrogen capable of reacting with the aldehyde. The hydrogen preferably occupies the ortho or para position in relation to the hydroxyl.

The polyphenols; that is, the compounds having more than one hydroxyl group on the aromatic nucleus can, likewise, be used.

The phenols are generally selected among the phenol, the para-terbutyl-phenol, the mono-terbutyl-paracresol, the diterbutyl-2,6-phenol, the diteramyl-2,4-phenol, the catechol, the beta-naphthol or the resorcinol. The diterbutyl-2,6-phenol will be advantageously used.

It is possible to use in the Mannich reaction a linear or cyclic alkyl-aldehyde or an aromatic aldehyde.

Preferably, there will be used the formaldehyde or derivatives thereof, such as paraformaldehyde, acetaldehyde or propionaldehyde.

The amine used in the Mannich reaction is a polyamine containing at least two primary amine groups. These molecules contain, in general, from 2 to 12, preferably 2 to 8, nitrogen atoms and from 2 to 60, preferably 2 to 20, carbon atoms.

As specific examples of said amines, there can be cited ethylene-diamine, propylene-diamine, diamino-1,4-butane and diamino-1,6-hexane.

There can also be used the polyalkylene and polyoxyalkylene polyamines. Among the polyalkylene polyamines there can be cited the polyethylene-amines such as diethylene-triamine, triethylene-tetramine, tetraethylene-pentamine and the polypropylene-amines such as dipropylene-triamines.

Among the polyoxyalkylene polyamines there will be preferably used the diamines and the triamines. These products have a molecular weight comprised between 400 and about 2,000. They are sold by Jefferson Chemical Company, Inc. under the trademark "JEFFAMINE" (D 230, D 400, D 1000 and T 403).

The (hydroxyphenyl)-alkylaldehydes and acids correspond, in general, to the formula:

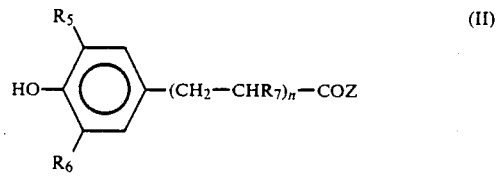

(II)

wherein $R_5$ and $R_6$ are alkyl radicals with $C_1$ to $C_{10}$, preferably $C_1$ to $C_5$;

$R_7$ is the hydrogen atom or the methyl radical;

n is an integer comprised between 0 and 2, preferably equal to 1; and

Z is hydrogen or the hydroxyl group.

There will be advantageously used the diterbutyl-3,5-hydroxy-4-benzaldehyde or the (diterbutyl-3,5-hydroxy-4-phenyl)-3-propionaldehyde or the (diterbutyl-3,5-hydroxy-4-phenyl)-3-propionic acid.

These (hydroxyphenyl)alkylaldehydes and acids react directly with the polyamines mentioned above for forming the primary amine having a phenolic group in its molecule. By using an aldehyde, the latter will be a Schiff base, while the acid will furnish an amine.

The copolymerization of the unsaturated monocarboxylic acid with the corresponding ester and eventually a nitrogenized monomer is carried out according to classical methods of free radical polymerization in solution in the presence of a primary radical such as azobisisobutyronitrile or a peroxide such as benzoyl or lauryl peroxide and of a chain-transfer agent such as dodecylmercaptan. The solvent can be an aromatic solvent such as toluene or xylene or a mineral or synthetic oil of the same nature as that to which the polymer must be added. There is used about 0.01 to 0.32 mole unsaturated acid, 0.7 to 0.99 mole of the corresponding ester and 0 to 0.3 mole of nitrogenized monomer.

The quantity of solvent will generally be such that the concentration by weight of dry material, at the end of the reaction, be comprised of between 10 and 30%, preferably about 25%.

The reaction is affected at a temperature comprised of between 40° and 140° C., preferably between 80° and 120° C. Depending on the conditions of operation, the duration of the reaction can range from 2 to 10 hours, preferably from 3 to 5 hours.

The copolymer is obtained in the form of a viscous solution.

The copolymer contains from 0.1 to 15% of units coming from the unsaturated acid, generally (meth)acrylic acid, from 70 to 99.9% of units coming from an unsaturated ester, in general, a (meth)acrylate, and from 0 to 15% of nitrogenized monomer of the Formula (I).

For grafting the unsaturated acid on a hydrocarbon polymer, there can be used any grafting method known for fixing a monomer on a hydrocarbon polymer. The polymer is generally dissolved in a hydrocarbon solvent. This solution, to which has been added a generator of free radicals, is brought to the grafting temperature and kept at that temperature for a time sufficient to form active sites on the copolymer. The unsaturated acid, preferably maleic anhydride, is added in a convenient quantity. There is generally used from 1 to 20%, preferably from 5 to 15%, by weight of unsaturated acid in relation to the hydrocarbon polymer.

The grafted polymer can then be isolated by evaporating the solvent. It is, likewise, possible to prepare the grafted polymer in an oil. Then it is not necessary to isolate the polymer which is collected in the form of a concentrated solution in the oil to which the primary amine will be added.

The grafting of the maleic anhydride on an olefinic polymer in solvent phase has been described in U.S. Pat. Nos. 4,144,181 and 4,137,185, while U.S. Pat. No. 3,862,265 and British Pat. Nos. 1,119,629, 857,797 and 832,193 have described a grafting process in the absence of solvent by mastication in the presence or absence of oxygen.

For inhibiting the cross-linking reactions during the grafting, U.S. Pat. No. 4,160,072 and European Pat. No. 171,167 recommend the use of chain-transfer agents such as mercaptans associated with promoters.

When the primary amine having a phenolic group originates from a phenol, it is obtained by the Mannich reaction. The Mannich base is obtained by adding from 0.8 to 1.5 mole, preferably 1.2 mole, of aldehyde, from 0.8 to 2.5 preferably 1, mole polyamine to one mole of phenol.

The reaction is carried out while stirring; first, at room temperature under an atmosphere of inert gas such as nitrogen, then, at a temperature comprised of between 80° and 130° C., preferably about 100° C., for a duration comprised of between 2 and 10 hours.

The operation is generally affected in the presence of a polar solvent like isopropanol or also an aromatic solvent like toluene or the xylenes. The water formed in the course of the reaction is azeotropically removed.

After the reaction, it is enough to eliminate the solvent for collecting the Mannich base which can be directly condensed on the copolymers of acid functions.

The formation of Schiff based from (hydroxyphenol) alkylaldehydes and polyamines and the formation of amides from (hydroxyphenol) alkyl acids and polyamines generally takes place by heating the reagents in a polar solvent forming an azeotrope with the water. The operating conditions are those described for the obtention of Mannich bases.

The condensation of the copolymer of carboxylic acid functions with the primary amine is affected in an organic solvent or in an oil at a temperature comprised of between 120° and 170° C. for from 3 to 8 hours. There is generally used from 0.8 to 1.2, preferably 1, mole of phenolic derivative per acid function of the copolymer.

There is observed a significant increase of the viscosity of the reaction medium. The condensation leads to the creation of amide functions on the copolymer carriers of free carboxylic groups or to the creation of imides on the copolymer carriers of anhydride groups.

The concentration of the products thus obtained in the lubricating compositions ready to use is generally on the order of from 0.2 to 15%, preferably from 1 to 10%, by weight.

However, more elevated concentrations, for example, from 15 to 30%, can be conceived when the lubricating composition is in the form of a concentrate to be diluted at the moment of use.

The additive can be incorporated into the natural or synthetic lubricating oils or into mixtures of those oils. By way of example, there can be cited the ordinary or refined mineral oils of paraffinic or naphthenic composition and the hydrorefined oils. The synthetic oils, such as the polybutenes, alkyl benzenes such as dinonylbenzene and tetradecyl benzene, the ethers or esters of polypropylene glycols, the esters of polycarboxylic acids such as methyl adipate and pentaerythritol heptanoate, the silicon oils such as polysiloxanes, the total or partial esters of phosphoric acid, especially the tricresyl phosphate and the alkyl phosphoric acids are equally convenient.

It is possible to associate the polymeric compounds according to the invention with other customary additives of lubricants such as inhibitors of corrosion, detergents and anti-wear dispersants and anti-foam additives.

The lubricating compositions containing the polymeric compound according to the invention can be used especially as oils for gear cases designed for internal combustion engines, oils for bridge gear cases, oils for gearing and for simplifying the machining of metals.

The examples that follow illustrate the invention without limiting it.

EXAMPLE 1

(a) There are introduced in a reactor, while stirring, 74.72 g (0.294 mole) of lauryl methacrylate, 24.72 g (0.731 mole) of stearyl methacrylate, 6.2 g (0.072 mole) of methacrylic acid, 0.07 g of dedecanethiol and 54.2 g of mineral oil 100N.

The whole is brought to 80° C. in 30 minutes under nitrogen atmosphere; then, there is added 0.18 g azobisisobutyronitrile and the temperature is kept at 80°-85° C. for 2 hours. After 2 hours of reaction, there is obtained a viscous mass that is diluted with 258 g mineral oil 150N. The whole is stirred at 80° C. for 15 minutes, then, there is introduced 0.03 g azobisisobutyronile. The mixture is brought to 100° C. and kept at said temperature for 1 hour, 30 minutes. After cooling at 20° C., the viscosity of this solution of polymer is 85 Pa.s.

(b) A Mannich base is prepared by introducing in a reaction 35.30 g (0.171 mole) diterbutyl-2,6-phenol, 23.94 g (0.206 mole) diamino-1,6-hexane and 68 g isopropanol, and stirring is effected until a homogeneous solution is obtained by heating the whole at 40° C. under nitrogen atmosphere. There are then introduced 6,38 g (0.212 mole) paraformaldehyde. The reaction medium becomes green, then yellow and limpid when heated to 60° C. After 10 hours of heating with reflux, the water formed is eliminated by azeotropic distillation and the solvent is eliminated by evaporation under vacuum. The product obtained is a viscous liquid characterized by RMN and IR (band of adsorption of 770 cm$^{-1}$ characteristic of a substitution in the para position of the phenol function).

(c) In a round-bottomed flask of 250 ml., 4.65 g of the solution of polymer prepared in 1a, 1.42 g of the Mannich base prepared in 1b and 38 g of xylene are brought to 150° C. for 8 hours while stirring and under atmosphere of inert gas. After evaporation of the solvent, there are obtained 26 g of a solution containing 29% of a polymer in a mixture of mineral oil and constituting additive I.

EXAMPLE 2

(a) A polymethacrylate is prepared like in Example 1a, but using the following monomers:

| | |
|---|---|
| lauryl methacrylate | 89.1 g (0.35 mole) |
| stearyl methacrylate | 30.1 g (0.089 mole) |
| methacrylic acid | 4.94 g (0.057 mole) |
| N.N dimethyl amino ethyl methacrylate | 4.90 g (0.031 mole) |
| dodecanethiol | 0.088 g |
| AIBN = | 0.25 + 0.03 g |
| oil 100 N = | 62 g |
| oil 150 N = | 216 g |

There is obtained a solution of a polymethacrylate with 31.7% active matter.

(b) 105.48 g of the solution of polymer prepared in 2a and 4.98 g of the Mannich base prepared in 1a are brought to 160° C. for 8 hours. The water formed in the course of the reaction is eliminated by removal with a current of nitrogen.

There is obtained a solution of polymethacrylate with 34.8% of active mater in a mixture of mineral oils.

EXAMPLE 3

(a) In a reactor controlled by thermostat of 1 l containing 80 g xylene, there are introduced, while stirring, 80 g of an ethylene-propylene copolymer having a medium molecular weight of 138,00 and containing 50% by weight propylene and the whole is kept at room temperature for 10 hours for dissolving the polymer, while at the same time, effecting a slight splash of nitrogen. There are then introduced 8 g maleic anhydride and 3.2 g of benzoyl peroxide. The mixture is brought to 80° C. and kept at said temperature with a slight suppression of nitrogen (~0.5 bar) for 4 hours. One part is precipitated in the isopropanol, dried under vacuum and characterized by infrared spectroscopy (anhydride bands 1790 and 1860 cm$^{-1}$, acid band 1710 cm$^{-1}$) and by elementary analysis indicating a percentage by weight of grafted monomer equal to 5%. The grafted polymer is preserved in solution in xylene.

(b) To the whole of the solution prepared in 3a and kept at 80° C., there is progressively added 26.7 g of the Mannich based prepared in 1b. An increase of the viscosity of the medium is observed. The reaction is continued for 1 hours. The reactor is then equipped with a Dean-Stark provided with a recovery reservoir. The temperature is raised to 120° C. and this temperature is maintained until obtaining the theoretical volume of water. The polymer is precipitated and characterized by IR imide bands (1705 and 1770 cm$^{-1}$), phenol band 3640 cm$^{-1}$, disappearance of the anhydride and primary amine bands.

EXAMPLE 4

(a) An amide is prepared by introducing 306 g (diterbutyl-3,5-hydroxy-4-phenyl) ethyl propionate and 515 g of diethylene triamine in a reactor of 1.1 equipped with a Dean Stark. The temperature is raised to 120° C. for 4 hours, the time necessary for collecting 40 g ethanol. There is obtained a viscous oil having a rate of conversion determined by RMN of 90%. For removing the excess of amine, washing with water is effected and the purified product insoluble in water is collected by decantation.

(b) The synthesis of the grafted polymer is repeated under the conditions of Example 3a, then 14.8 g of the amide prepared according to 4a are added, and the whole is left for 1 hour while stirring at 80° C. The reactor is then equipped with a Dean Stark and the solvent is brought to reflux for eliminating the water by azeotropic distillation. The polymer is precipitated and characterized by infrared spectroscopy imide bands (1705, 1770 cm$^{-1}$, amide band (1680 cm$^{-1}$), phenol band (3640 cm$^{-1}$), and disappearance of the anhydride and primary amine bands.

EXAMPLE 5

(a) A Schiff base is prepared by bringing to 60° C. 8.8 g (8.5.10$^{-2}$ mole) diethylenetriamine in 50 g xylene. There are then added 20 g (8.5.10$^{-2}$ mole) diterbutyl-3,5-hydroxy-4-benzaldehyde previously dissolved in 50 g xylene. This is left for 1 hour at 60° C. while stirring, then for 2 hours at 80° C. under a slight splash of nitrogen until obtaining the theoretical volume of water.

(b) The synthesis of the grafted polymer is repeated the conditions of Example 3a, then 11.05 g of the Schiff base prepared according to 5a are added and the whole is left for 1 hour while stirring at 80° C. The reactor is then equipped with a Dean Stark and the solvent is brought to reflux for eliminating the water by azeotropic distillation. The polymer is precipitated in isopropanol, dried and characterized by infrared spectroscopy imide bands (1705, 1770 cm$^{-1}$), phenol band (3640 cm$^{-1}$) and disappearance of the anhydride and primary amine bands.

EXAMPLE 6

In this example, there is studied the effect of the additives of the invention on the viscosity index of the lubricating oils under the conditions of the standard NT 60-100 with the aid of a CANNON-FENSKE viscosimeter starting from lubricating compositions obtained by adding the additives of the invention to a mineral oil "150 Neutral" (neutral paraffinic oil having a viscosity equal to 33.10$^{-6}$ m$^2$/s at 36.8° C. and 8.34.10$^{-6}$ m$^2$/s at 98.9° C., and a viscosity index equal to 105).

It is reminded that the viscosity index (VI$_E$) of an oil has a number that characterizes the variation of viscosity of said oil as a function of the temperature in a conventional scale. Said index is higher as said variation is smaller.

| Oil 150 N+ | | % of Additive (in active matter) | Viscosity at 36.8° C. in 10$^{-6}$ m$^2$/s | Viscosity at 98.9° C. in 10$^{-6}$ m$^2$/s | VI$_E$ |
|---|---|---|---|---|---|
| I | a | 2 | 39.0 | 6.90 | 137 |
| I | c | 2 | 41.8 | 7.26 | 138 |
| II | a | 2 | 43.60 | 7.63 | 144 |
| II | b | 2 | 43.48 | 7.72 | 148 |

The incorporation of the additives according to the invention into a lubricating oil improves in a substantial manner the viscosity index of this oil. Besides, by comparing the results obtained with the reference polymers Ia and IIa, it can be observed that the polymers Ic and IIb of the invention have on the viscosity index an effect that is better than or equal to those of the control polymers.

EXAMPLE 7

In this example, the thermal stability of the polymers of the invention and more particularly, the period of time inducement to oxidation are measured by differential thermal analysis.

A sample of the polymers of the invention is heated to 200° C. for 10 minutes under a current of nitrogen, the current of nitrogen is then replaced by a current of oxygen (~10 l/h), and at the same time, the chronometer is disconnected and there is measured the period of time of inducement (T) corresponding to the appearance of an exothermal phenomer characteristic of the beginning of oxidation of the polymer.

| Additive | Ic | IIb | IIIb | IVb | Vb | Ia | IIa | IIIa |
|---|---|---|---|---|---|---|---|---|
| T (mn) | 60 | 60 | 65 | 110 | 47 | 1 | 1 | 1 |

It is observed that the fixing of antioxidizing patterns on the polymers stabilizes and effectively protects them against oxidation at high temperatures. The results are to be compared with those obtained with the reference polymers Ia, IIa and IIIa, which are very sensitive to the presence of oxygen at high temperatures.

What is claimed is:

1. Polymeric compounds comprised of the condensation produce of (1) a primary amine having one phenolic group in its molecule and (2) a copolymer of a carboxylic acid, said copolymer formed by (a) copolymerization of an unsaturated monocarboxylic acid and at least one ester of said acid or by (b) grafting an unsaturated acid on a hydrocarbon polymer.

2. Polymeric compounds according to claim 1 wherein the copolymer is obtained by copolymerization of an unsaturated monocarboxylic acid with at least one ester of said acid.

3. Polymeric compounds according to claim 2, wherein said unsaturated acid is (meth)acrylic acid and the esters are formed by reacting said unsaturated acid with $C_1$ to $C_{22}$ alcohols.

4. Polymeric compounds according to claim 3, wherein said esters are alkyl methacrylates of variable chain lengths of between $C_6$ and $C_{15}$.

5. Polymeric compounds according to claim 1, wherein said ester is a nitrogenized ester corresponds to the general formula:

$$CH_2=CR_1-CO-X-R_2-NR_3R_4 \quad (I)$$

wherein $R_1$ is a hydrogen atom or a methyl radical;

X represents an oxygen or a sulfur atom or the group —NH—;

$R_2$ is an alkylene group containing from 2 to 6 carbon atoms; and $R_3$ and $R_4$, identical or different, are alkyl, cycloalkyl, alkylaryl or aryl radicals.

6. Polymeric compounds according to claim 1, which are formed by copolymerization of from 0.01 to 0.32 mole unsaturated monocarboxylic acid, from 0.7 to 0.99 mole of the unsaturated monocarboxylic acid ester, and from 0 to 0.3 mole nitrogenized monomer.

7. Polymeric compounds according to claim 1, wherein the unsaturated acid grafted on a hydrocarbon polymer has one polymerizable double bond and at least one acid group or precursor of acid or one anhydride group.

8. Polymeric compounds according to claim 7, wherein said unsaturated acid is maleic anhydride.

9. Polymeric compounds according to claim 7, wherein said hydrocarbon polymer is an ethylene copolymer containing from 15 to 90% by weight of ethylene, from 0 to 20% by weight of a non-conjugated diene, a $C_3$ to $C_{14}$ alpha olefin.

10. Polymeric compounds according to claim 7, wherein said hydrocarbon polymer is a dienic copolymer obtained by copolymerization of two diolefins or of one diolefin with styrene.

11. Polymeric compounds according to claim 7, wherein said hydrocarbon polymer is a homopolymer of one diolefin or of one alpha olefin containing at least four carbon atoms.

12. Polymeric compounds according to claim 1, wherein said primary amine having one phenolic group in its molecule is obtained from one phenol having at least one active hydrogen, one aldehyde and one polyamine.

13. Polymeric compounds according to claim 1, wherein said primary amine having one phenolic group in its molecule is obtained by reaction of one polyamine with one aldehyde or acid of the general formula:

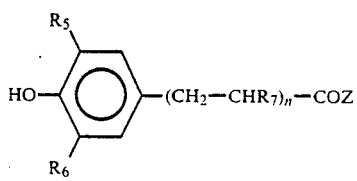

wherein $R_5$ and $R_6$ are alkyl radicals $C_1$ to $C_{10}$;

$R_7$ is the hydrogen atom or the methyl radical;

n is an integer comprised between 0 and 2, preferably equal to 1; and

Z is hydrogen or the hydroxyl group.

14. Polymeric compounds according to claim 13, wherein said compound of the general Formula II is (diterbutyl-3,5-hydroxy-4-phenyl)-3-propionaldehyde or (diterbutyl-3,5-hydroxy-4-phenyl)-3-propionic acid.

15. Polymeric compounds according to claim 12, wherein said polyamine contains from 2 to 12 nitrogen atoms of which at least two are primary amine groups containing from 2 to 60 carbon atoms.

16. Polymeric compounds according to claim 13, wherein said polyamine is a polyalkylene polyamine or a polyoxyalkylene polyamine.

17. Polymeric compounds according to claim 1, wherein the condensation of the copolymer having carboxylic acid groups with the primary amine having one phenolic group in its molecule is carried out in an organic solvent or in an oil at a temperature comprised between 120° and 170° C. for 3 to 8 hours using 0.8 to 1.2 moles of phenol per carboxylic group of the copolymer.

18. Polymeric compounds according to claim 1 wherein the copolymer is obtained by copolymerization of an unsaturated monocarboxylic acid with at least one derivative of such an acid wherein said derivative is a nitrogenized monomer.

19. A lubricating composition which contains a natural or synthetic lubricating oil and from 0.2 to 15% by weight of a copolymeric compound comprised of the condensation product of (1) a primary amine having one phenolic group in its molecule and (2) a copolymer of a carboxylic acid, said copolymer formed by (1) copolymerization of an unsaturated monocarboxylic acid and at least one ester of said acid, or by (b) grafting an unsaturated acid on a hydrocarbon polymer.

20. A lubricating composition according to claim 19, which contains at least one other lubricant selected from the group consisting of corrosion inhibitors, detergents and anti-wear dispersants and anti-foam additives.

21. A concentrated lubricating composition which contains a natural or synthetic lubricating oil and from 15 to 20% by weight of a copolymeric compound comprised of the condensation product of (1) a primary amine having one phenolic group in its molecule and (2) a copolymer of a carboxylic acid, said copolymer formed by (a) copolymerization of an unsaturated monocarboxylic acid and at least one ester of said acid, or by (b) grafting an unsaturated acid on a hydrocarbon polymer.

* * * * *